(12) United States Patent
Ford

(10) Patent No.: US 8,776,429 B2
(45) Date of Patent: Jul. 15, 2014

(54) TROLLING DIVER DEVICE

(75) Inventor: Randolph K. Ford, Stayner (CA)

(73) Assignee: Grayden Outdoor, LLC, Brainerd, MN (US)

(*) Notice: Subject to any disclaimer, the term of this patent is extended or adjusted under 35 U.S.C. 154(b) by 395 days.

(21) Appl. No.: 12/807,539

(22) Filed: Sep. 8, 2010

(65) Prior Publication Data

US 2011/0239524 A1 Oct. 6, 2011

Related U.S. Application Data

(63) Continuation-in-part of application No. 29/349,463, filed on Apr. 6, 2010, now Pat. No. Des. 630,703.

(51) Int. Cl.
*A01K 91/08* (2006.01)
(52) U.S. Cl.
USPC .......................................... 43/43.13; 43/42.23
(58) Field of Classification Search
CPC ..................................................... A01K 91/08
USPC .................. 43/43.13, 42.22, 42.23, 43.1; 242/394.1; D22/145
See application file for complete search history.

(56) References Cited

U.S. PATENT DOCUMENTS

| | | | | |
|---|---|---|---|---|
| 2,566,029 A * | 8/1951 | Louthan | | 43/43.13 |
| D191,166 S * | 8/1961 | Abramson | | D22/145 |
| 3,271,892 A * | 9/1966 | Sabrsula | | 43/42.03 |
| 3,643,370 A * | 2/1972 | Cook et al. | | 43/43.13 |
| 3,940,871 A * | 3/1976 | Evans | | 43/43.13 |
| 4,065,869 A * | 1/1978 | Berry | | 43/43.12 |
| 4,161,841 A * | 7/1979 | Holstein | | 43/43.13 |
| 4,567,687 A * | 2/1986 | Even et al. | | 43/43.13 |
| 5,339,561 A * | 8/1994 | Weber | | 43/43.13 |
| 6,412,215 B1 * | 7/2002 | Even | | 43/43.13 |
| 7,380,365 B2 * | 6/2008 | Noraker | | 43/42.06 |
| 7,703,235 B2 * | 4/2010 | Ford | | 43/43.13 |
| 2008/0083153 A1 * | 4/2008 | Ford | | 43/43.13 |
| 2011/0252691 A1 * | 10/2011 | Heyne | | 43/43.13 |

FOREIGN PATENT DOCUMENTS

| | | | | |
|---|---|---|---|---|
| DE | 202012000921 | * | 4/2012 | |
| GB | 2131262 A | * | 6/1984 | A01K 97/00 |

OTHER PUBLICATIONS

Luhr-Jensen Jet Diver, Cabelas.com, customer rating review dating Nov. 20, 2006.*
Jet Diver, www.luhrjensen.com/jet-diver/jet diver, default, pd.html.*

* cited by examiner

*Primary Examiner* — Kimberly Berona
(74) *Attorney, Agent, or Firm* — Olson & Cepuritis, Ltd.

(57) ABSTRACT

A trolling diver device includes a cylindrical body carried by a guide plate and a fin extending away from the cylindrical body for positioning a lure or bait at a predetermined depth. The diver is lowered and maintained at the predetermined depth while a fishing line connected to a boat pulls the diver through the water. A release arm is pivotally mounted to the guide plate and releasably movable between a locked and unlocked position for orienting the diver device in water so as to minimize drag while raising a hooked fish and the diver device toward the surface.

17 Claims, 3 Drawing Sheets

TROLLING DIVER DEVICE

CROSS-REFERENCE TO RELATED APPLICATIONS

This application is a continuation-in-part application of U.S. Design patent application Ser. No. 29/349,463, filed Apr. 6, 2010 now U.S. Pat. No. Des. 630,703, which is incorporated herein by reference.

FIELD OF THE INVENTION

The present invention relates to a trolling diver device for use during fishing, in particular, a trolling diver device having a release mechanism.

BACKGROUND OF THE INVENTION

Trolling is a type of fishing where one or more fishing lines are baited and drawn through the water by a boat or ship.

While trolling in the Great Lakes, the oceans, or other bodies of water, it is often necessary to carry a lure or the bait to a specific depth to catch different types of fish. One way to carry the lure or bait to a particular depth is by using of a fishing diver. The fishing diver may be attached to a fishing line and may lower to a particular depth as the boat or ship moves through the water. Once the diver reaches the desired depth, it is pulled behind the boat while the attached lure or bait is presented to attract the fish.

Divers may be configured for diving to different depths or for trolling various regions in the water depending on the shape of the diver and the length and type of the fishing line used with the diver.

Some divers have a rounded or circular shape that allows the diver to cover wide areas in the water to either side of the boat. These types of divers, however, are not ideal for deep diving and the rounded shape creates extra drag resistance when moving through the water, in particular, when retrieving a hooked fish.

Some divers, such at the JET DIVER™ manufactured by Luhr Jensen have a thin and elongate design and can lower through the water to a desired depth while the boat is moving. Once a fish is hooked, however, fishermen will want to retrieve the fishing line and to pull the diver as well as the hooked fish to the surface. This task may be difficult to accomplish with the JET DIVER™ and other known divers. Although divers, such as the JET DIVER™, are designed to lower through the water with minimal drag resistance, they are not designed to be retrieved and raised through the water with the same efficiency once a fish has been hooked. While being raised, the body of the diver is not oriented relative to the surface for moving through the water with minimal drag resistance. Instead, the water pushes against the body of the diver and provides considerable resistance, therefore making it difficult to pull the diver toward the surface.

Some divers have release mechanisms used for retrieving the diver and the hooked fish. These known divers, however, are insufficient for deep diving and being maintained at the desired depth. Additionally, known divers having release mechanisms are not shaped to allow retrieval with minimal drag resistance. In other words, even if the release mechanism is actuated, it may still be difficult to raise the diver toward the surface of the water since it does not have a narrow and streamlined design for raising through the water with minimal drag resistance.

Accordingly, improvements in diver devices are still being sought.

SUMMARY OF THE INVENTION

The present invention provides a novel and improved trolling fishing diver device for diving to various depths while facilitating retrieval and raising to the surface with minimal drag resistance. The fishing diver includes a guide plate, a cylindrical body, and a fin having an elongate and streamlined contour for allowing the diver to travel through the water to a desired depth as the boat is moving at a trolling speed and retrieval through the water with minimal drag resistance when the fishing line is reeled in.

The fishing diver includes a release arm, a pair of upstanding ears and a catch assembly for orienting the fishing diver in a "trolling" mode and a "release" mode. The release arm at one end may be operably connected to a fishing line and at the other end pivotally mounted to the guide plate for movement between a secured locked position at the catch assembly and a free released position.

As the fish strikes the bait, a downwardly force is applied to the fishing diver causing tension to increase in the fishing line. Since the fishing line is firmly held by the fisherman or secured to a fishing rod mounted to the boat, the increased tension causes the release arm to dislodge from the catch assembly and move from the secured locked position to the free released position.

As the release arm is freed from the catch assembly, the fishing diver is reoriented relative to the release arm. The downward force from the hooked fish and the tension in the fishing line causes the fishing diver to assume a position where the guide plate is generally aligned with the release arm and the fishing line. The guide plate is, therefore, oriented so as to align itself with the fishing line such that the fishing diver can be retrieved with minimal drag resistance.

DETAILED DESCRIPTION OF THE PREFERRED EMBODIMENTS

Figure 1:
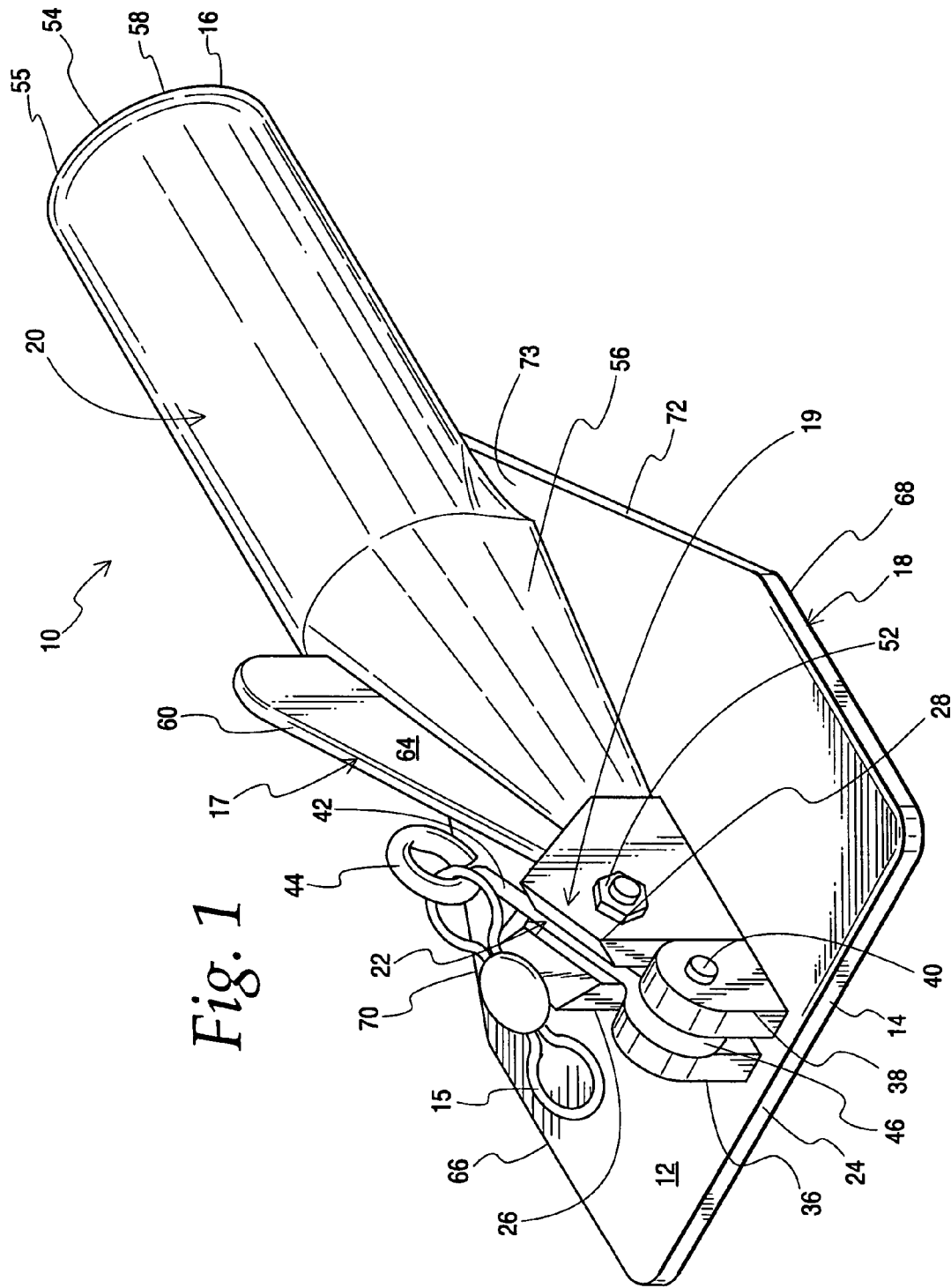
FIG. 1 is a side perspective view of the trolling diver device illustrating the present invention.

The invention disclosed herein is, of course, susceptible of embodiment in many forms. Shown in the drawings and described herein below in detail are the preferred embodiments of the invention. It is to be understood, however, that the present disclosure is an exemplification of the principles of the invention and does not limit the invention to the illustrated embodiments.

A fishing diver 10, as generally shown in FIGS. 1-6, has a generally thin and elongate design that allows movement through a body of water with minimal drag resistance. The fishing diver 10 is configured to carry a lure or bait to a specific depth in the body of water and remain at that specific depth while a moving boat pulls the diver 10. Once a fish strikes the lure or bait, a release mechanism is triggered that rotates the fishing diver 10 to an orientation for retrieval toward the surface with minimal drag resistance from the water.

Figure 2:
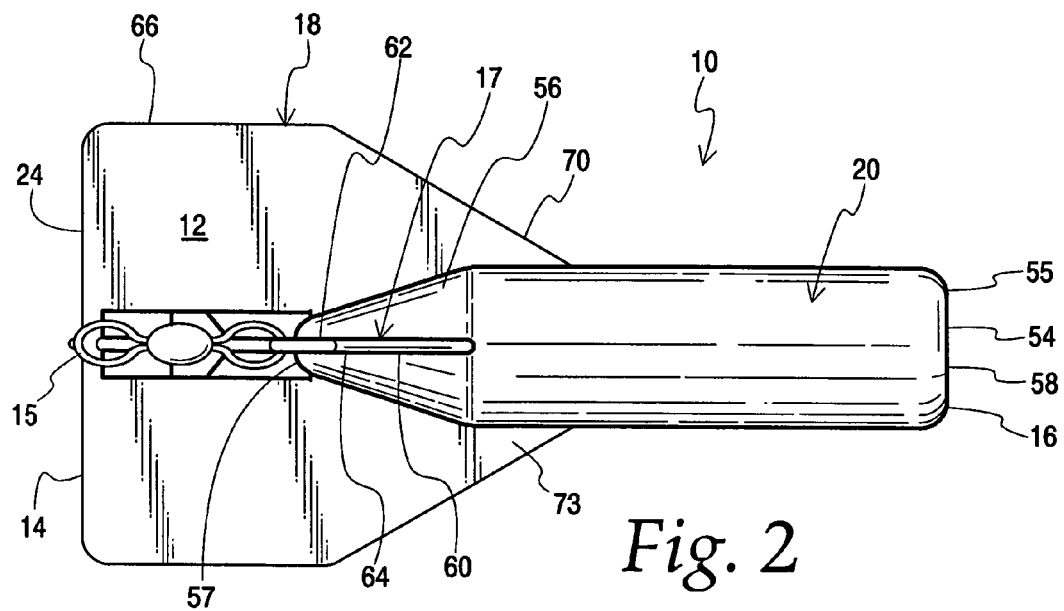
FIG. 2 is a top plan view of the trolling diver device of FIG. 1.
Figure 3:
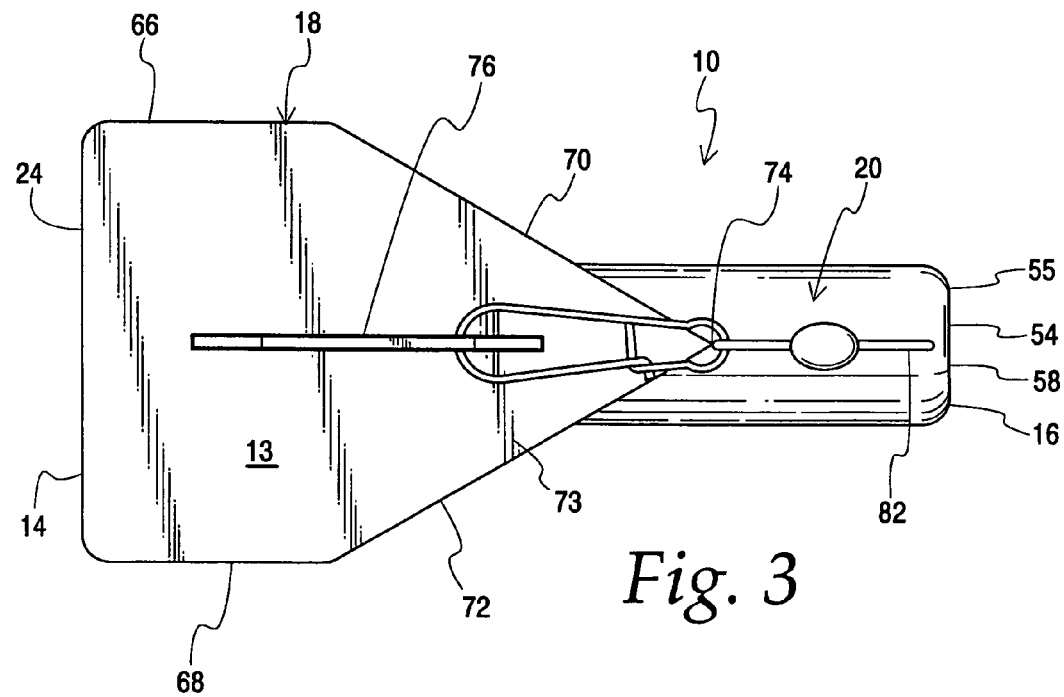
FIG. 3 is a bottom plan view of the trolling diver device of FIG. 1.

The fishing diver 10 has a forward end 14 and a rearward end 16, and also includes a guide plate 18 having an upper surface 12 and a lower surface 13 (FIG. 2). Included at the forward end 14 is a forward connection 15 for connecting a trolling line or fishing line to the boat.

Several structural elements are carried by the guide plate 18. In particular, a pair of upstanding ears 36 and 38 and a catch assembly 19 are located on the upper surface 12 of the guide plate and adjacent the forward end 14 and a generally cylindrical body 20 is located adjacent the rearward end 16. As shown in FIGS. 3-6, a lure connector 76 depends from the lower surface 13 of the guide plate and is adjacent the forward end 14 of the fishing diver. The lure connector 76 may comprise virtually any convenient arrangement. For example, a lure, or virtually any type of fish attracting device, either artificial or natural, may be used in conjunction with one or more hooks or hooked objects.

Figure 4:
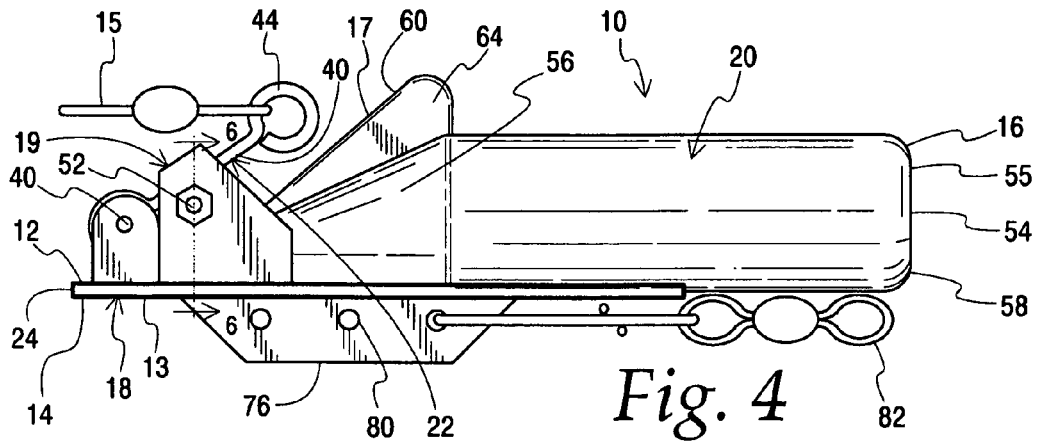
FIG. 4 is a side view of the trolling diver device of FIG. 1 having a release arm in a secured locked position.
Figure 5:
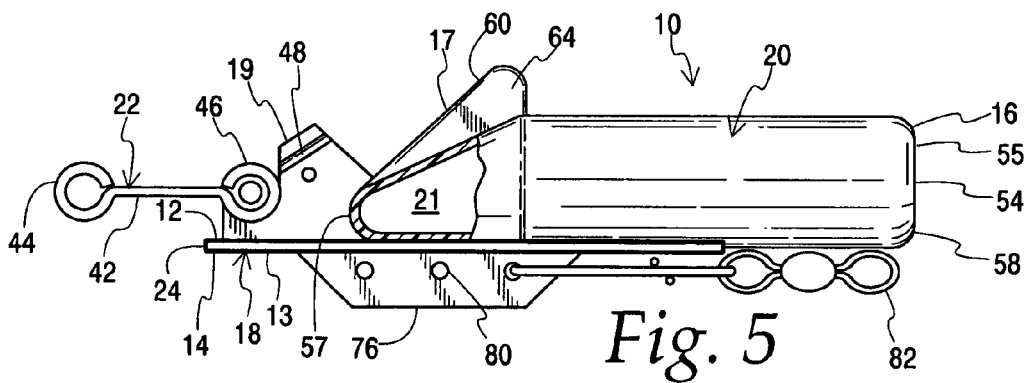
FIG. 5 is a partially cutaway side view of the trolling diver device of FIG. 1 having the release arm in an unlocked released position.

According to one aspect of the present invention, the fishing diver 10 is configurable in at least two different orientations and modes of operation, with the capability of being automatically transferred from a "trolling" mode (FIG. 4) to a "release" mode (FIG. 5). The automatic transfer is provided by the adjustable catch assembly 19 that releasably engages a release arm 22.

When in the "trolling" position indicated in FIG. 4, the fishing diver 10 is configured to lower through the water and to be pulled behind the boat at the desired predetermined depth. In particular, while in the "trolling" position, the forward end 14 of the fishing diver dips in a downwardly direction as water flows over the upper surface 12 causing the depth of the fishing diver 10 to increase.

In one example, the fishing diver 10 is configured such that the forward end 14 is heavier than the rearward end 16. This orients the fishing diver 10 with the forward end 14 lower than the rearward end 16 while entering the water and therefore disposes the upper surface 12 at an inclined angle relative to the surface of the water. As the boat begins to move and pull the fishing line, the upper surface 12 of the guide plate is pulled against the water. As water flows over the upper surface 12, a downwardly force is exerted causing the fishing diver 10 to travel through the water at an oblique angle. As the fishing line is pulled by the boat, water will continue to flow against the upper surface 12, causing the fishing diver 10 to continue to travel downwardly through the water until it reaches the desired predetermined diving depth.

The predetermined diving depth of the fishing diver 10 may be determined by a variety of different factors including the length of the cylindrical body 20 and the amount of fishing line attached to the fishing diver 10. Additional factors affecting diving depth of the fishing diver 10 may include the trolling speed of the boat and the weight and thickness of the fishing line.

As mentioned above, the fishing diver 10 will remain at the desired predetermined depth as it is pulled through the water. The fishing diver 10, however, is generally buoyant and configured to float while the boat is not moving. In other words, once movement of the boat stops, the fishing diver 10 will rise through the water and float at the surface.

A release mechanism is provided for raising the fishing diver 10 to the surface with minimal drag resistance once a fish has been hooked. In one example, the release mechanism may include the release arm 22 pivotally secured to the catch assembly 19 such that the pulling force of the fishing line from the moving boat will be insufficient to dislodge the release arm 22 from the catch assembly 19. When a fish strikes the lure, tension on the fishing line is increased as the fish applies a downward force to the fishing diver 10. This increased tension may be enough to overcome the force applied to the release arm 22 from the catch assembly 19 and thereby free the release arm 22 from the catch assembly 19. This causes the fishing diver 10 to move from the "trolling" position (FIG. 4) to the "release" position (FIG. 5) by pivoting about the freed release arm 22. The pivoting causes the guide plate 18 and the release arm 22 to generally align with the fishing line as the rearward end 16 of the fishing diver is pulled downward. While in the "release" position, the release arm 22 extends beyond an end portion of the guide plate 18 such that the fishing diver 10 is oriented in a streamlined fashion relative to the surface of the water for allowing retrieval of the diver 10 and the hooked fish to the surface with minimal drag resistance.

Figure 6:
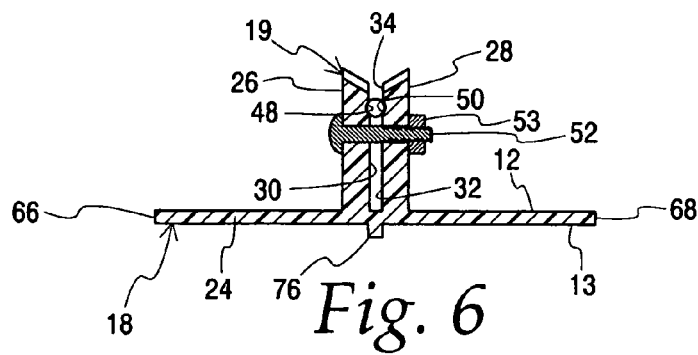
FIG. 6 is a front sectional elevation, taken along plane 6-6 of the trolling diver device shown in FIG. 4, and showing the release arm in locked position.

The adjustable catch assembly 19 is carried by the guide plate 18 and located adjacent and in a slightly overlapping configuration with a fin 17. The catch assembly 19 includes a pair of spaced apart juxtaposed plates 26 and 28 that extend away from the upper surface 12 of the guide plate. As shown in FIG. 6, the plates 26 and 28 are substantially parallel to one another, and have opposed faces 30 and 32 that define an elongated recess 34 dimensioned to releasably receive the pivotally mounted release arm 22.

The pivotal connection of the release arm 22 and the guide plate 18 is provided by the pair of spaced apart upstanding ears 36 and 38 that receive pivot pin 40 for engaging the release arm 22. The upstanding ears 36 and 38 are located generally adjacent to and extend away from the guide plate 18.

The release arm 22 may have a generally rod-like portion 42 connected between a top end 44 and a bottom end 46. The top end 44 has a rolled portion forming a fastening eye for securement to the forward connection 15. The bottom end 46 has a rolled portion forming another fastening eye for securement to the pivot pin 40. As shown in FIG. 4, the release arm 22 is received between parallel plates 26 and 28 of the catch assembly 19 so as to remain in the "trolling" mode but is capable of having a pivot range of at least 180° when rotated from the "trolling" mode to the "release" mode about the pivot pin 40.

The opposed faces 30 and 32 of the parallel plates 26 and 28 each have recessed grooves 48 and 50 to receive the release arm 22. Each of the recessed grooves 48 and 50 may have a rounded configuration capable of receiving and securing at least a portion of the rod-like portion 42 of the release arm.

The parallel plates 26 and 28 are sufficiently flexible to enable the release arm 22 to be snapped into and out of the recessed grooves 48 and 50. An adjustment screw 52 is provided between the parallel plates 26 and 28 and is used to adjust the spacing between the parallel plates 26 and 28 and thus the width of the elongated recess 34. Screw 52 may be configured to threadably engage nut 53. In this manner, the amount of force required to snap the release arm 22 out of the recessed grooves 48 and 50 of the elongated recess 34 can be adjusted.

The amount of force required to snap the release arm 22 out of the recessed grooves 48 and 50 can be checked manually by snapping the release arm 22 into and out of recessed grooves 48 and 50 and determining the amount of force by feel. If necessary, the amount of force involved can be adjusted by turning the adjustment screw 52 with a screwdriver. The amount of force required to snap the release arm 22 out of the recessed grooves 48 and 50 preferably is set high enough to prevent the release arm 22 from snapping free when the lure or hook touches the bottom or is pulled through weeds, but is set low enough to allow the release arm 22 to snap free when a fish strikes the hook.

The generally cylindrical body 20 is an elongate and at least partially hollow structure. The hollow structure contributes to the buoyancy of the fishing diver 10 and therefore permits floatation of the fishing diver 10 while the boat is not moving or the fishing diver 10 is not being pulled in a horizontal or downward direction.

A portion of the cylindrical body 20 may be carried at least partially by the upper surface 12 of the guide plate as another portion extends rearwardly beyond the guide plate 18. The cylindrical body 20 may also include a distal end portion 54 and terminate in a tapered proximal end portion 56. The distal end portion 54 may be generally rounded and terminate in a cap 58 that encloses the hollow cylindrical body 20 which defines enclosed space 21. The tapered proximal end portion 56 may be adjacent the guide plate 18 and generally tapered in a direction toward the guide plate 18. The tapered proximal end portion 56 may also include an inwardly taper that narrows as the cylindrical body 20 extends toward the forward end 14.

The distance between a distal edge 55 of the distal end portion 54 and a distal edge 57 of the tapered proximal end portion 56 may vary depending on the construction and the desired dive depth of the fishing diver 10. Generally, the shorter the distance between the distal edges 55 and 57 of the distal end portion 54 and the tapered proximal end portion 56, the shallower the fishing diver 10 will dive. As the distance increases, so will the depth that the fishing diver 10 may dive. In one example, the length of the cylindrical body 20 may be substantially the same as the length of the guide plate 18. As mentioned above, other factors, such as the length, weight and thickness of the fishing line and the trolling speed of the boat may factor into the diving depth of the fishing diver 10.

The cylindrical body 20 may be a separate structure or may be integrally molded with the guide plate 18 and fin 17. In another example, the fishing diver 10 may be a single unit and the cylindrical body 20 may be unitary with the guide plate 18 and fin 17.

The fin 17 stabilizes the fishing diver 10 as it moves through the water. In particular, the fin 17 may extend away from the tapered proximal end portion 56 and provide streamlined movement of the fishing diver 10 through the water. The fin 17 may extend upwardly from the tapered proximal end portion 56 and have an oblique edge 60 positioned substantially normal to the guide plate 18. In one example, the oblique edge 60 of the fin may extend in a direction away from the distal end portion 54 and toward the forward end 14 of the fishing diver. In another example, the oblique edge 60 of the fin may extend in a direction toward the distal end portion 54 and away from the forward end 14 of the fishing diver.

The fin 17 also includes two opposite side surfaces 62 and 64 disposed on either side of the oblique edge 60. While the fishing diver 10 is pulled behind the boat, water will flow on both sides of the fin 17 and against the opposite side surfaces 62 and 64. The fin 17 and the opposite side surfaces 62 and 64 provide stability and maintain the fishing diver 10 in a stable position, generally free from wobbling, as it moves through the water.

The fin 17 may be a separate structure or may be integrally molded with the cylindrical body 20 and catch assembly 19. In another example, the fishing diver 10 may be a single unit and the fin 17 may be unitary with the cylindrical body 20 and catch assembly 19.

The guide plate 18 allows the fishing diver 10 to move through the water to the desired depth and has a leading edge 24 that provides for movement through the water with minimal drag resistance. The guide plate 18 may be carried by the cylindrical body 20 and have an end portion extending forward beyond the tapered proximal end portion 56 of the cylindrical body. In one example, the guide plate 18 may be attached to the underside of the cylindrical body 20, whereas in another example, the guide plate 18 may be carried by a side surface of the cylindrical body by being received within a slot of the cylindrical body 20.

The guide plate 18 is substantially flat and includes the leading edge 24, opposite and generally parallel edges 66 and 68 and opposite transverse edges 70 and 72 that intersect at an apex 74. These edges may be connected to configure the guide plate 18 in a deltoid shape or a wedged-like shape such as a sphenoid.

The guide plate 18 may have a distal portion 73 where the opposite transverse edges 70 and 72 connect to one another at the apex 74 located at the underside of the cylindrical body 20. The apex 74, while adjacent to the distal end portion 54, may still be proximate to the tapered proximal end portion 56 depending on the length of the cylindrical body 20 and the length of the guide plate 18. The apex 74 and the transverse edges 70 and 72 are configured together such that the distal portion 73 of the guide plate may be spread in a splay configuration or have any other type of spread configuration.

The lure or bait may attach to a lure connector 76 that depends from and is integral with the lower surface 13 of the guide plate. While attached, the lure or bait dangles below the lure connector 76 and attracts the fish as the boat moves through the water.

The lure connector 76 may have a thin and narrow design and generally aligned with the longitudinal axis of the cylindrical body 20 providing minimal drag resistance as the fishing diver 10 moves through the water. The lure connector 76 includes a plurality of spaced apertures 80 used for connecting a rearward connector 82. The rearward connector 82 may have one end attached to any one of the plurality of spaced apertures 80 and another end for attaching the lure or bait.

The foregoing description and the accompanying drawings are illustrative of the present invention. Still other variations and arrangements of parts are possible without departing from the spirit and scope of this invention.

I claim:

1. A trolling diver device, comprising:
   a hollow cylindrical body defining an enclosed space, having a rounded distal end portion and terminating in a tapered proximal end portion;
   a guide plate carried by the cylindrical body and having an end portion extending beyond the tapered proximal end portion of the cylindrical body;
   a fin on the cylindrical body at the tapered proximal end portion thereof, substantially normal to the guide plate and extending away from the tapered proximal end portion toward the distal end portion;
   a release arm having one end pivotally mounted to the end portion of the guide plate between a pair of upstanding ears and a free end;
   a catch assembly carried by the guide plate for releasably receiving the release arm; and a lure connector depending from the guide plate and integral therewith.

2. The trolling diver device of claim 1 wherein the catch assembly includes a pair of juxtaposed plates having opposed recessed grooves for releasably engaging the release arm.

3. The trolling diver device of claim 1 wherein the pair of upstanding ears is located on the upper surface of and adjacent to the forward end of the guide plate for pivotally mounting the release arm to the guide plate.

4. The trolling diver device of claim 1 wherein the release arm extends beyond the end portion of the guide plate when in a released position.

5. The trolling diver device of claim 1 wherein the release arm is substantially aligned with guide plate when the trolling diver device is in a released position.

6. The trolling diver device of claim 1 wherein the release arm has a free end that terminates in a swivel.

7. The trolling diver device of claim 1 wherein the fin has an oblique edge that extends away from the distal end portion.

8. The trolling diver device of claim 1 wherein the fin is tapered in a direction substantially normal to guide plate.

9. The trolling diver device of claim 1 wherein the lure connector is aligned with the longitudinal axis of the cylindrical body.

10. The trolling diver device of claim 1 wherein the cylindrical body is unitary with the guide plate.

11. The trolling diver device of claim 1 wherein the fin is unitary with the cylindrical body.

12. The trolling diver device of claim 1 wherein the guide plate has a shape selected from a group consisting of a deltoid and a sphenoid.

13. The trolling diver device of claim 1 wherein the guide plate is substantially flat.

14. The trolling diver device of claim 1 wherein the guide plate has a distal portion having a splay configuration.

15. The trolling diver device of claim 1 wherein guide plate has an apex adjacent the distal end portion but proximate to the proximal end portion of the cylindrical body.

16. The trolling diver device of claim 1 wherein the guide plate is carried by a side surface of the cylindrical body.

17. A trolling diver device, comprising:
a cylindrical body having a rounded distal end portion and terminating in a tapered proximal end portion;
a guide plate attached at the underside of the cylindrical body and extending beyond the tapered proximal end portion of the cylindrical body;
a fin on the cylindrical body at the tapered proximal end portion thereof and extending away from the tapered proximal end portion and the guide plate;
a release arm having one end pivotally mounted to the guide plate and a free end adapted for connection to a trolling line;
a catch assembly on the guide plate having a pair of upstanding parallel plates, each plate having a recessed groove for releasably engaging the release arm;
an adjustment screw threadably engaged between the pair of parallel plates for adjusting the spacing between the pair of parallel plates;
a pair of upstanding ears adjacent the guide plate;
a pivot pin engaged between the pair of upstanding ears for pivotally mounting the release arm; and
a lure connector depending from the guide plate and integral therewith.

* * * * *